United States Patent
Lu et al.

(10) Patent No.: US 11,425,240 B2
(45) Date of Patent: Aug. 23, 2022

(54) DETECTION OF SPOOFED CALLS USING CALL HEADER

(71) Applicant: Google LLC, Mountain View, CA (US)

(72) Inventors: Shi Lu, Cupertino, CA (US); Jun Yin, Palo Alto, CA (US); Ji Yang, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/258,738

(22) PCT Filed: Aug. 25, 2020

(86) PCT No.: PCT/US2020/047780
§ 371 (c)(1),
(2) Date: Jan. 7, 2021

(87) PCT Pub. No.: WO2021/118655
PCT Pub. Date: Jun. 17, 2021

(65) Prior Publication Data
US 2022/0124195 A1    Apr. 21, 2022

Related U.S. Application Data

(60) Provisional application No. 62/948,183, filed on Dec. 13, 2019.

(51) Int. Cl.
*H04M 3/42* (2006.01)
*H04W 4/16* (2009.01)
*H04M 3/22* (2006.01)

(52) U.S. Cl.
CPC ..... *H04M 3/42042* (2013.01); *H04M 3/2281* (2013.01); *H04M 3/42357* (2013.01); *H04W 4/16* (2013.01)

(58) Field of Classification Search
CPC .......... H04M 3/42042; H04M 3/2281; H04M 3/42357; H04W 4/16
(Continued)

(56) References Cited

U.S. PATENT DOCUMENTS 9,729,586 B2    8/2017  Brewer et al.
2007/0081648 A1*  4/2007  Abramson ............ H04M 3/436
                                                379/161
(Continued)

FOREIGN PATENT DOCUMENTS

WO    WO 2008/146265    12/2008

OTHER PUBLICATIONS

"Combating Spoofed Robocalls with Caller ID Authentication", https://www.fcc.gov/call-authentication, Jan. 7, 2021.
(Continued)

*Primary Examiner* — Ahmad F. Matar
*Assistant Examiner* — Jirapon Intavong
(74) *Attorney, Agent, or Firm* — IP Spring

(57) ABSTRACT

Implementations described herein relate to methods, systems, and computer-readable media to label incoming phone calls. A method to label an incoming phone call includes detecting the incoming phone call associated with a caller identifier (ID), determining a location associated with the call, and analyzing a call header of the call to determine one or more call characteristics. The method further includes determining, based on the location and the call characteristics, if the location is spoofed and determining, based on the caller ID and the call characteristics, if an access network associated with the call is spoofed. The method further includes applying a trained machine learning model to determine whether the call is a robocall. The method further includes assigning a label to the call that indicates whether
(Continued)

the call is a spoofed call or is the robocall and sending the label to a callee device associated with the call.

20 Claims, 5 Drawing Sheets

(58) Field of Classification Search
USPC .......................................................... 455/415
See application file for complete search history.

(56) References Cited

U.S. PATENT DOCUMENTS

| | | | |
|---|---|---|---|
| 2007/0121596 A1* | 5/2007 | Kurapati | H04M 7/0078 370/356 |
| 2012/0294435 A1 | 11/2012 | Cox et al. | |
| 2018/0249005 A1* | 8/2018 | Dowlatkhah | H04M 3/42059 |
| 2018/0295140 A1* | 10/2018 | Lu | H04L 65/102 |
| 2019/0174000 A1 | 6/2019 | Bharrat et al. | |

OTHER PUBLICATIONS

"How to block all unknown calls on iPhone", https://www.iphonefaq.org/archives/975781, Jan. 7, 2021.

"International Search Report and Written Opinion in International Application No. PCT/US2020/047780, filed Aug. 25, 2020", Nov. 23, 2020, 12 Pages.

"Public Service Announcement, Chinese Embassy Scam", https://www.ic3.gov/media/2019/190328.aspx, Jan. 7, 2021.

Dan Weber, et al., "Mark and Sweep Robocall Detection and Prevention", Jan. 7, 2021, 11 Pages.

Verizon, "Answer with Confidence", https://www.verizonwireless.com/solutions-and-services/call-filter/, Jan. 7, 2021.

* cited by examiner

DETECTION OF SPOOFED CALLS USING CALL HEADER

RELATED APPLICATIONS

This application is a § 371 national stage of PCT International Application No. PCT/US20/47780, filed Aug. 25, 2020, entitled, "Detection of Spoofed Calls Using Call Header," which claims the benefit of U.S. Provisional Application No. 62/948,183, entitled "Detection of Spoofed Calls Using Call Header," and filed on Dec. 13, 2019, which is incorporated herein by reference in its entirety for all purposes.

BACKGROUND

Users receive a large number of unwanted telephone calls, e.g., spam calls or robocalls. Interruption due to such calls as well time spent answering such calls is wasteful. Further, when the call is a malicious call, users may incur other types of costs, such as financial loss, stealing of user information, etc. While mechanisms such as caller identifier (caller ID) are available to determine caller identity, it is relatively easy for caller ID to be spoofed.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, systems, and computer-readable media to label incoming phone calls.

In some implementations, a computer-implemented method to label an incoming phone call includes detecting the incoming phone call associated with a caller identifier (ID). The method further includes determining a location associated with the incoming phone call. The method further includes analyzing a call header of the incoming phone call to determine one or more call characteristics. The method further includes determining, based on the location and the one or more call characteristics, if the location is spoofed. The method further includes determining, based on the caller ID and the one or more call characteristics, if an access network associated with the incoming phone call is spoofed. The method further includes applying a trained machine learning model to determine whether the incoming phone call is a robocall. The method further includes assigning a label to the incoming phone call, wherein the label indicates whether the incoming phone call is a spoofed call or whether the incoming phone call is the robocall. The method further includes sending the label to a callee device associated with the incoming phone call.

In some implementations, analyzing the call header of the incoming phone call may comprise determining a route between a caller device associated with the incoming phone call and the server based on route information included in the call header. In some implementations, the one or more characteristics include a number of hops between the caller device and the server. In these implementations, determining the route comprises calculating the number of hops based on the route.

In some implementations, determining if the location is spoofed includes retrieving a reference number of hops from a database based at least in part on the route information included in the call header and determining that the location is spoofed if the number of hops is different from the reference number of hops.

In some implementations, determining if the location is spoofed includes retrieving a reference route from a database based at least in part on the caller ID, determining whether the route matches the reference route, and in response to determining that the route does not match the reference route, determining that the location is spoofed.

In some implementations, the method further includes determining respective one or more characteristics of a plurality of intermediate devices in the route based on the call header. In these implementations, determining whether the route matches the reference route includes determining a count of the plurality of intermediate devices that have respective one or more characteristics that match characteristics of intermediate devices in the reference route and determining that the route matches the reference route if the count of the plurality of the plurality of intermediate devices meets a threshold.

In some implementations, analyzing the call header of the incoming phone call includes determining a timezone associated with the incoming phone call. In these implementations, determining if the location is spoofed includes determining a caller timezone based on the caller ID and determining that the location is spoofed in the timezone associated with the incoming phone call is different from the caller timezone.

In some implementations, analyzing the call header includes determining, based on the call header, that the incoming phone call is associated with a cellular network. In these implementations, determining if the access network associated with the incoming phone call is spoofed includes retrieving a cellular network identifier and a cell identifier from the call header, and determining that the access network is spoofed if at least one of the cellular network identifier or the cell identifier is missing or erroneous.

In some implementations, the machine learning model is trained using data from a training database. The data may include prior call data including prior caller ID, prior caller IP address, and prior call route information. In some implementations, the prior call data for one or more prior calls in the prior call data is one or more of: indicative of a caller phone number or caller internet protocol (IP) address associated with at least one of: greater than a threshold number of prior outgoing calls in a particular period or multiple consecutive prior outgoing calls; indicative of a caller phone number that had at least three prior outgoing calls that were simultaneous; indicative of location spoofing or access network spoofing; or associated with a spam report.

In some implementations, the label is usable by the callee device to provide a user alert that indicates that the incoming phone call is the spoofed call and/or the robocall, or to automatically handle the incoming phone call.

Some implementations include a non-transitory computer-readable medium with instructions stored thereon that, when executed by one or more hardware processors, cause the one or more hardware processors to perform operations that include detecting an incoming phone call associated with a caller identifier (ID); determining a location associated with the incoming phone call; analyzing a call header of the incoming phone call to determine one or more call characteristics; determining, based on the location and the one or more call characteristics, if the location is spoofed;

determining, based on the caller ID and the one or more call characteristics, if an access network associated with the incoming phone call is spoofed; applying a trained machine learning model to determine whether the incoming phone call is a robocall; assigning a label to the incoming phone call, wherein the label indicates whether the incoming phone call is a spoofed call or whether the incoming phone call is the robocall; and sending the label to a callee device associated with the incoming phone call.

In some implementations, the operation of analyzing the call header of the incoming phone call includes determining a route between a caller device associated with the incoming phone call and the server based on route information included in the call header. In some implementations, the one or more characteristics include a number of hops between the caller device and the server, and wherein determining the route comprises calculating the number of hops based on the route. In some implementations, the operation of determining if the location is spoofed includes retrieving a reference number of hops from a database based at least in part on the route information included in the call header and determining that the location is spoofed if the number of hops is different from the reference number of hops.

In some implementations, the operation of determining if the location is spoofed includes retrieving a reference route from a database based at least in part on the caller ID, determining whether the route matches the reference route, and in response to determining that the route does not match the reference route, determining that the location is spoofed.

In some implementations, the operation of analyzing the call header includes determining, based on the call header, that the incoming phone call is associated with a cellular network, and the operation of determining if the access network associated with the incoming phone call is spoofed includes retrieving a cellular network identifier and a cell identifier from the call header and determining that the access network is spoofed if at least one of the cellular network identifier or the cell identifier is missing or erroneous.

In some implementations, the label is usable by the callee device to provide a user alert that indicates that the incoming phone call is the spoofed call and/or the robocall, or to automatically handle the incoming phone call.

Some implementations include a system comprising one or more hardware processors and a memory coupled to the one or more hardware processors, with instructions stored thereon, that when executed by the one or more hardware processors, cause the one or more hardware processors to perform operations that include detecting an incoming phone call associated with a caller identifier (ID); determining a location associated with the incoming phone call; analyzing a call header of the incoming phone call to determine one or more call characteristics; determining, based on the location and the one or more call characteristics, if the location is spoofed; determining, based on the caller ID and the one or more call characteristics, if an access network associated with the incoming phone call is spoofed; applying a trained machine learning model to determine whether the incoming phone call is a robocall; and assigning a label to the incoming phone call, wherein the label indicates whether the incoming phone call is a spoofed call or whether the incoming phone call is the robocall.

In some implementations, the operation of analyzing the call header of the incoming phone call includes determining a route between a caller device associated with the incoming phone call and the server based on route information included in the call header.

In some implementations, the one or more characteristics comprises a number of hops between the caller device and the server, wherein the operation of determining the route includes calculating the number of hops based on the route, and wherein the operation of determining if the location is spoofed includes retrieving a reference number of hops from a database based at least in part on the route information included in the call header and determining that the location is spoofed if the number of hops is different from the reference number of hops.

DETAILED DESCRIPTION

Some implementations described herein relate to detection of whether an incoming phone call is a spoofed call and/or a robocall. For example, a spoofed call may be a call that is associated with a caller identification (caller ID) or other information that is not genuine. Various actors such as telemarketers, malicious actors, or others may use a non-genuine caller ID when placing calls to users, e.g., to make it appear as though the call is from a number and/or location that the user is likely to trust.

In many countries, a user may have a phone number associated with a particular geography, e.g., the user's home location; a particular service provider, e.g., wireless carrier, landline service provider, etc.; or based on other parameters. For example, in the United States, the first three digits of a phone number may be indicative of a geographic region for the home location. In another example, in some countries, certain digits of a phone number may be indicative of the carrier at which the call originates, e.g., the carrier of the device that placed the call.

In some examples, a spoofed call may include a caller ID that includes incorrect caller information. For example, when placing a call, a telemarketer may use a caller ID that is associated with the same geography as a recipient of the call to make it appear as though the call is from a local phone number. In another example, when placing a call, a malicious caller may use a caller ID that includes digits that are not associated with digit patterns that users may associate with malicious callers, e.g., numbers ending in certain patterns (e.g., "000000") or such.

A robocall may be a call that is placed using automated techniques. For example, a robocall may be placed using a computer or other device that automatically dials outgoing calls. Further, a robocall may include a prerecorded message that is automatically played as caller-side audio when a call is answered. For example, a telemarketer may use a prerecorded message that includes content that markets a particular product or service. A telemarketer may place robocalls to a large number of users, e.g., in a target audience determined based number lists, geographic regions, and/or other parameters. Many users consider such automated calls as unwanted or undesirable and may decline such calls based on caller ID. However, when a spoofed call is placed by a robocaller, the user is not able to determine that the call is associated with a robocaller prior to answering the call.

Detecting that a call is a spoofed call or a robocall can help reduce or prevent users having to answer such calls. Some implementations described herein automatically detect whether a call is a spoofed call or a robocall.

Figure 1:
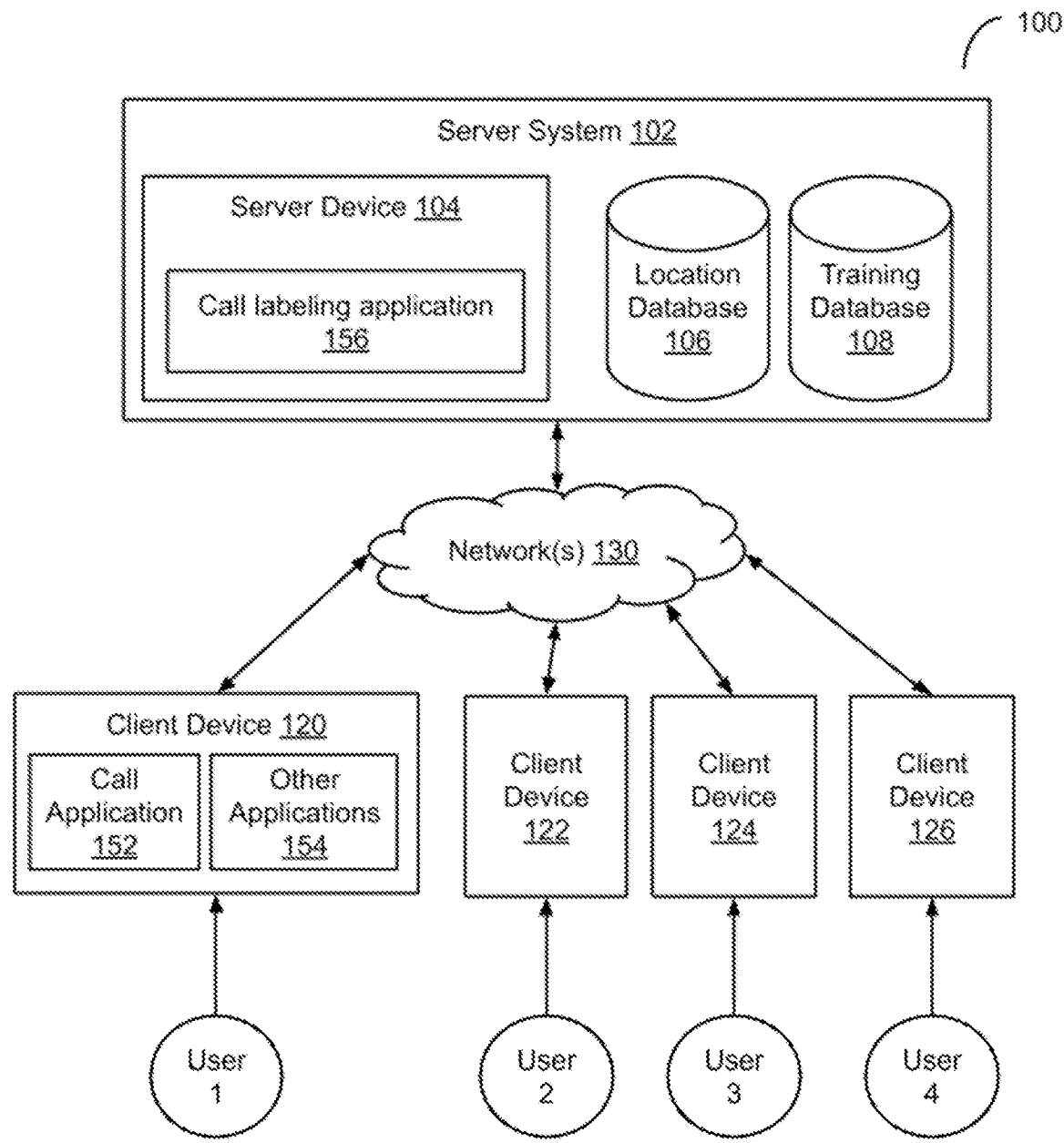
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with other systems and devices over a network 130. Server system 102 can include a server device 104, a location database 106, and a training database 108. In some implementations, server device 104 may provide a call labeling application 156.

Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, public switched telephone network (PSTN), etc. Network 130 may include network infrastructure such as cellular base stations, routers, gateways, etc. For example, network 130 may include one or more Voice over IP (VoIP) to PSTN gateways.

In some implementations, server system 102 may be hosted by a carrier, e.g., a cellular telephony provider, a landline provider, a VoIP provider, or any other telephony provider. While FIG. 1 shows a single server system 102, in some implementations, each carrier may have respective server systems that provide various functions related to telephone calls. For example, such functions may include, e.g., enabling a client device to place a telephone call to another device; labeling a telephone call; routing a telephone call; ringing a callee device; enabling a caller to leave a voicemail or video message; enabling text messages, e.g., via short message service (SMS), rich communication services (RCS), etc.; and other functions related to calls or messaging.

For ease of illustration, FIG. 1 shows one block for server system 102 with a single server device 104, location database 106, and training database 108, and shows four blocks for client devices 120, 122, 124, and 126. Server blocks 102, 104, 106, and 108 may represent multiple systems, server devices, and network databases, and the blocks can be provided in different configurations than shown. For example, server system 102 can represent multiple server systems that can communicate with other server systems via network 130. In some implementations, server system 102 can include cloud hosting servers, for example. In some examples, location database 106, training database 108, and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cellular phone, tablet computer, television, TV set top box or entertainment device, wearable devices (e.g., display glasses or goggles, wristwatch, headset, armband, jewelry, etc.), personal digital assistant (PDA), media player, game device, etc. that includes telephony functionality. In some implementations, network environment 100 may not have all of the components shown and/or may have other elements including other types of elements instead of, or in addition to, those described herein.

In various implementations, end-users user 1, user 2, user 3, and user 4 may utilize communicate with server system 102 and/or each other using respective client devices 120, 122, 124, and 126. In some examples, users U1, U2, U3, and U4 may interact with each other via applications running on respective client devices, e.g., a call application 152 and/or server system 102, and/or via a network service, e.g., a VoIP service, an over-the-top (OTT) calling service, or other type of network service, implemented on server system 102. For example, respective client devices 120, 122, 124, and 126 may place telephone calls to other client devices via server system 102 or other server systems.

In some implementations, any device of client devices 120, 122, 124, and/or 126 can provide one or more applications. For example, as shown in FIG. 1, client device 120 may provide a call application 152. Client devices 122-126 may also provide similar applications. For example, call application 152 may provide a user of a respective client device with the ability to receive telephone calls. For example, call application 152 may be a software application that executes on client device 120. In some implementations, call application 152 may provide a user interface. For example, the user interface may include information related to the call, e.g., a caller identifier (caller ID) associated with the call, the name of the caller (e.g., from an address book of the user associated with the client device that receives the call, stored on the client device or on a server system), etc. In some implementations, the user interface may provide indications such as whether the caller ID of the caller is spoofed, whether the call is a robocall, whether the call is a spam or likely unwanted call, etc. For example, a robocall may be call placed by a caller that uses automated calling tools to place outgoing phone calls.

In some implementations, one or more of client devices 120-126 may include one or more other applications 154. For example, other applications 154 may be applications that provide various types of functionality, e.g., calendar, address book, email, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of other applications 154 may be standalone applications that execute on client device 120. In some implementations, one or more of other applications 154 may access a server system that provides data and/or functionality of applications 154.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device, e.g., a touchscreen or other display screen, projector, etc. In some implementations, the user interface may include audio, such as beeps or other sounds that are played by a speaker of the client device, or played via headphones or other audio output devices coupled to the client device. In some implementations, the user interface may include a visual interface displayed on a display device and audio.

Different implementations of features described herein can use any type of system and/or service. Any type of electronic device can make use of features described herein. Some implementations can provide one or more features described herein on one or more client or server devices disconnected from or intermittently connected to computer and/or telephony networks.

Figure 2:
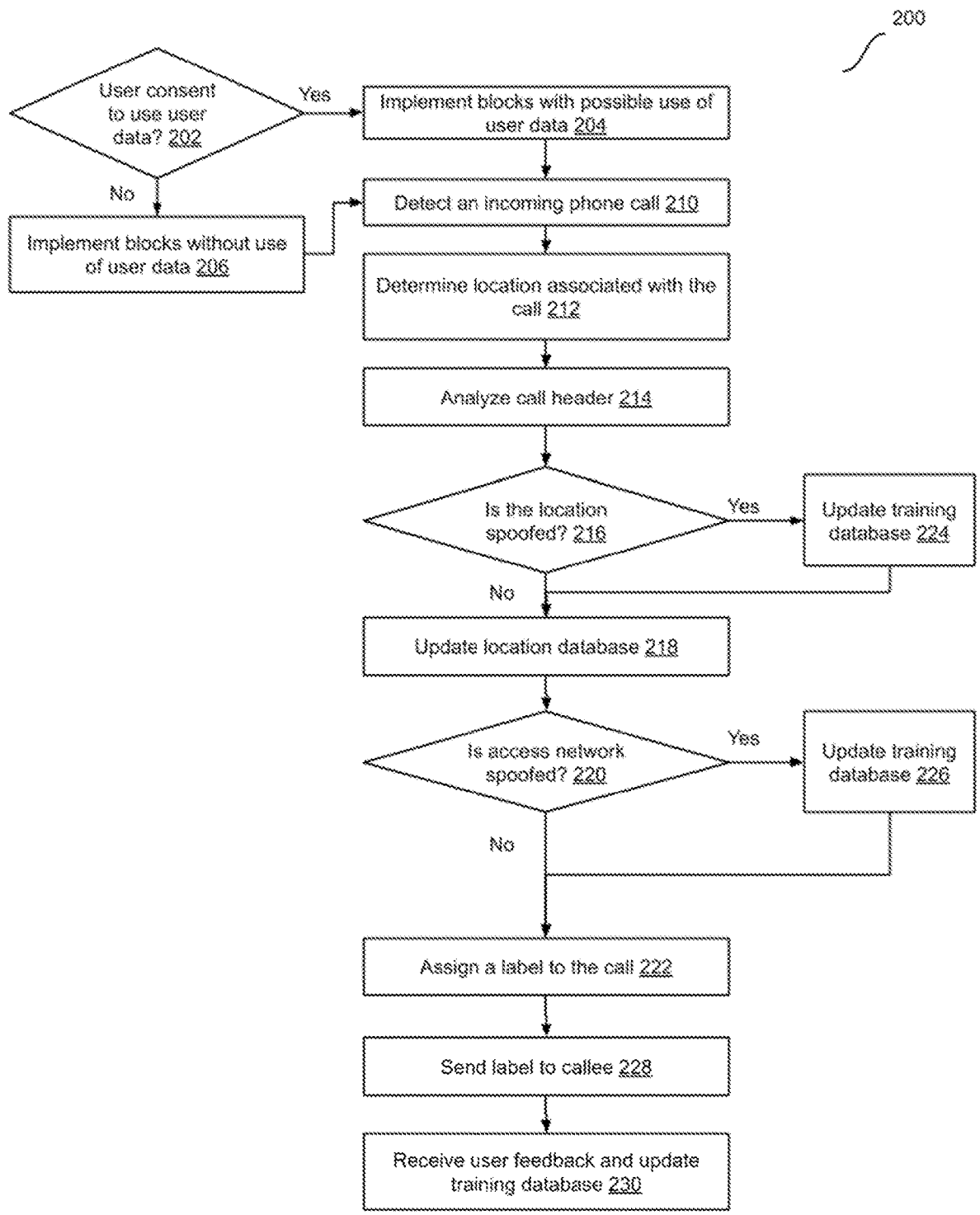
FIG. 2 is a flow diagram illustrating an example method to label a phone call, according to some implementations.

FIG. 2 is a flow diagram illustrating an example method 200 to label a phone call, according to some implementations. In some implementations, method 200 can be implemented, for example, on a server system 102 as shown in FIG. 1.

In the described examples, the implementing system includes one or more digital processors or processing circuitry ("processors"), and one or more storage devices that are used to store a location database 106 and a training database 108. In some implementations, different components of one or more servers can perform different blocks or other parts of the method 200. In some examples, a first device is described as performing blocks of method 200. Some implementations can have one or more blocks of method 200 performed by one or more other devices (e.g., other server devices) that can send results or data to the first device.

In some implementations, the method 200, or portions of the method, can be initiated automatically by a server system. For example, the method (or portions thereof) can be performed based on one or more particular events or conditions, e.g., an incoming phone call being received by a server system that implements method 200.

Method 200 may begin at block 202. At block 202, it is checked whether user consent (e.g., user permission) has been obtained to use user data in the implementation of method 200. For example, user data can include user interaction data, e.g., a clickstream, user's schedule, user data related to the use of a messaging application, user preferences, user biometric information, user characteristics (e.g., identity, name, age, gender, profession, user's cognitive and/or motor capabilities, etc.), information about a user's social network and contacts, social and other types of actions and activities, content, ratings, and opinions created or submitted by a user, a user's current location, historical user data such as usage patterns associated with software applications on a user computing device, images generated, received, and/or accessed by a user, images viewed or shared by a user, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 210. If user consent has not been obtained, it is determined in block 206 that blocks are to be implemented without the use of user data, and the method continues to block 210. In some implementations, if user consent has not been obtained, blocks are implemented without the use of user data and with synthetic data and/or generic or publicly-accessible and publicly-usable data. In some implementations, if user consent has not been obtained, method 200 is not performed.

In block 210, an incoming phone call is detected. For example, a device that implements method 200 (e.g., server device 104) may receive a call request for a telephone call. In some implementations, the call request may be in the form of a call initiation message, e.g., a message sent using session initiation protocol (SIP) or other suitable protocol. In some implementations, the call initiation message may include a caller ID. In some implementations, the call initiation message may include a call header. In implementations in which the call initiation message uses SIP, the call header is a SIP header.

In some implementations, the call header may include a network address, e.g., an internet protocol (IP) address, associated with a caller device that initiated the telephone call. In some implementations, the call header may include a length of route, e.g., path between the caller device and the device that implements method 200. For example, the length of route may correspond to a number of hops that the call initiation message passed through. In some implementations, the number of hops may be included in a field labeled "MAX-FORWARDS" in the call header.

In some implementations, the call header may include timezone information, e.g., a timezone associated with the caller device. in some implementations, the call header may include route information, e.g., that lists information about one or more hops that the call initiation message passed through. In some implementations, the route information may include a network address for each hop, a receiving port number, a network protocol identifier, e.g., that indicates the type of network protocol over which the call initiation message was received at each hop (e.g., user datagram protocol, or other protocol). In some implementations, the route information may include a plurality of fields, each field corresponding to a respective hop in the route. In some implementations, the route information in call header may be modified at each hop in the route, e.g., each device (corresponding to a hop) that receives and forwards the call initiation message may append a record indicative of information about the hop to the call initiation message.

Figure 3:
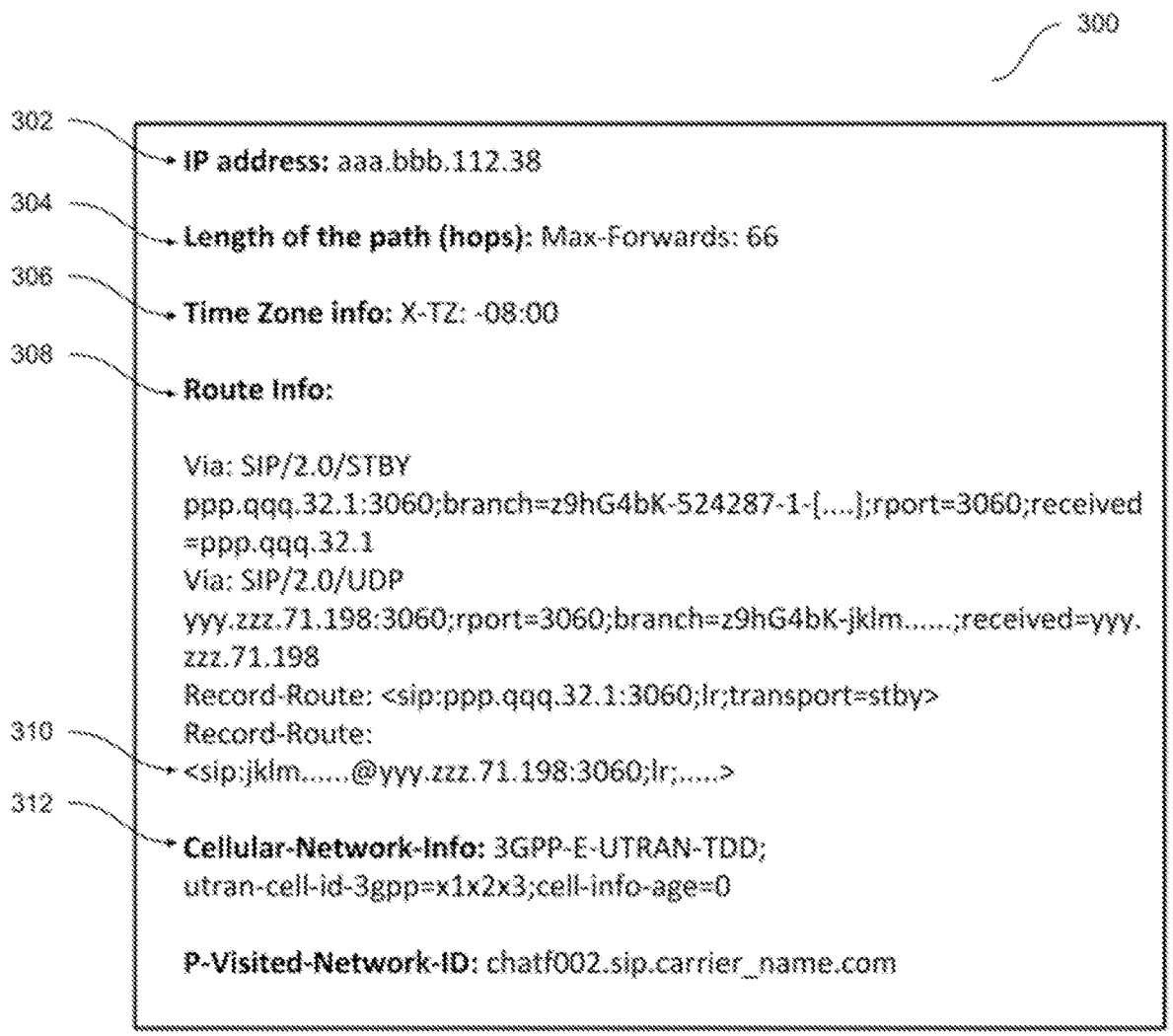
FIG. 3 is a diagram illustrating an example call header for a phone call.

In some implementations, e.g., when the caller device is a cellular device, the call header may include cellular network information. For example, the cellular network information may include a type of cellular network (e.g., 3G, 4G, LTE, 5G, etc.); a cell identifier (e.g., corresponding to the cell or base station that the caller device is coupled to at the time of placing the call); a network identifier; and/or other information about the cellular network. In some implementations, e.g., when the cellular device is configured to handle calls using Voice-over-WiFi, the network information may include information of a WiFi network that the cellular device is connected to. FIG. 3 illustrates an example of a call header. Block 210 may be followed by block 212.

In block 212, a location associated with the call, e.g., a location associated with the caller device is determined. In some implementations, the location associated with the call may be determined based on caller ID. For example, if the caller ID corresponds to a telephone number in the United States, the location associated with the caller may be determined as the United States. More particularly, the location may be determined as a specific location, e.g., a city block, a city, a region, or other aggregation, that corresponds to the caller ID, e.g., the first three digits of the caller ID. In some implementations, when the caller ID includes a country code, a country may be determined. A database of caller identifiers may be stored and utilized (e.g., in location database 106) to determine the location. Location database 106 may permit lookup of location using partial or full caller ID. In some implementations, e.g., if the caller ID is missing or not in a standard telephone number format, the location is determined to be unavailable. Block 212 may be followed by block 214.

In block 214, the call header is analyzed to determine one or more call characteristics. In some implementations, the one or more characteristics may include a number of hops between a caller device and the server that received the call initiation message. For example, the number of hops may be a call characteristic included in the call header.

In some implementations, analyzing the call header may include determining a route between a caller device associated with the incoming phone call and the server based on route information included in the call header, e.g., network addresses (IP addresses) or other information. For example, when a call is placed from a cellular telephone serviced by a first carrier (Carrier 1) and the call initiation message is analyzed at a server of a second carrier (Carrier 2), the route may be determined as caller device→carrier1 base station→carrier1 server→carrier1→to-carrier2-line→carrier2 server. In this example, the number of hops may be calculated from the route, e.g., 3 hops (between the caller device and carrier2 server). In some implementations, when the call header does not include the number of hops or route information, the number of hops may be determined as unknown.

In some implementations, the one or more characteristics may include whether the call is associated with a cellular network, a landline network, or a VoIP or OTT service. In these implementations, if the call header includes one or more fields that indicate that the caller device is a cellular telephone (e.g., a carrier name, a cell identifier corresponding to a mobile base station, or other information), it may be determined that the phone call is associated with a cellular network. In another example, if the caller device is a landline telephone, a VoIP telephone, or an OTT phone, it may be determined that the incoming phone call is not associated with a cellular network. In some implementations, it may be determined that the incoming phone call is associated with a landline, a VoIP provider, or an OTT provider, based on the call header including information corresponding to a landline, VoIP or OTT service provider. This is useful since many VoIP/OTT providers generate special SIP headers that are different from the incumbent local exchange carrier (ILEC).

In some implementations, the one or more characteristics may include determining a timezone associated with the incoming phone call. For example, analyzing the call header may include determining the timezone from a timezone field in the call header. The timezone field can be in various formats such "Date," "X-TZ," etc. An example of a timezone field in date format is "Date: Tue, 25 Sep 2018 23:20:21 GMT" Block 214 may be followed by block 216.

In block 216, it is determined if the location associated with the call is spoofed. In some implementations, determining if the location is spoofed may include determining a caller timezone based on the caller ID. For example, the caller timezone may be determined as GMT-8.00 based on the caller ID being associated with a caller in California (or another location in the Pacific timezone). In these implementations, determining if the location is spoofed may further include determining that the location is spoofed in the timezone associated with the incoming phone call, e.g., as determined from analyzing the call header timezone, is different from the caller timezone. For example, If a US landline number has location/routing patterns of international calls and/or the timezone (e.g., in the SIP field "Date") is outside of the US, it is very likely that the is spoofed.

In some implementations, determining if the location is spoofed may include retrieving a reference number of hops from a database based on the route information. For example, the reference number of hops may be determined based on a caller ID associated with the call. The reference number of hops may be determined based on prior calls, e.g., between caller IDs that are similar to the caller ID (e.g., associated with the same or similar geographic region).

For example, prior calls that originate from caller IDs in the San Francisco, Calif. region to callee devices in the Los Angeles, Calif. region may be analyzed to determine that the reference number of hops for such calls is a particular number, e.g., 5. For example, the reference number of hops may be a statistical value, e.g., a mean, median, or mode of the number of hops, calculated over the prior calls and other routing information such as IP addresses of the routes. Such determination may be made by a server that implements method 200 or by another server that has access to prior call data. To make such a determination, call data is used with specific user permission. Calls associated with users that do not provide such permission are excluded from prior calls used for the determination.

In some implementations, it may be determined that the location is spoofed if the number of hops associated with the call (determined in the one or more call characteristics from analysis of the call header in block 214) is different from the reference number of hops. For example, if the number of hops associated with the call is greater than the reference number of hops, it may indicate that the call passed through more intermediate devices than usual. This may occur, e.g., when the caller device attempts to spoof its location as a particular region (e.g., San Francisco, Calif.) while actually being located in a different location. Such location spoofing may be attempted, e.g., by unwanted or malicious callers that attempt to get a recipient to answer a call based on spoofed caller ID. In some implementations, the reference number of hops may be a range, e.g., 5-8 hops, to allow for variation in the number of hops in genuine calls, e.g., due to changing network conditions.

In some implementations, determining if the location is spoofed may include retrieving a reference route from a database based on at least in part on the caller ID. For example, the reference route may be determined based on prior call data, e.g., by analyzing route information for user-permitted prior calls. The reference route may be a typical route for calls between prior caller IDs associated with the same location (or region) as the incoming phone call and call recipients associated with the same location (or region) as the callee. For example, a call placed between devices that are on the same cellular carrier and in the same city may traverse a route caller device→carrier base station→carrier backhaul→carrier base station→callee device.

In these implementations, determining if the route is spoofed may further include determining whether the route for the incoming phone call (determined in block 214) matches the reference route. In some implementations, a plurality of reference routes may be retrieved from the database and compared with the route for the incoming phone call.

In some implementations, retrieving a reference route may include retrieving respective one or more characteristics of a plurality of intermediate devices in the reference route. In some implementations, respective one or more characteristics of a plurality of intermediate devices in the route may be determined based on the call header of the incoming phone call. In these implementations, determining whether the route matches the reference route may include determining a count of the plurality of intermediate devices that have respective one or more characteristics that match characteristics of intermediate devices in the reference route. In these implementations, it may be determined that the route matches the reference route if the count of the plurality of the plurality of intermediate devices meets a threshold, and that the route does not match the reference route if the count of the plurality of the plurality of intermediate devices does not meet the threshold. For example, if a total number of intermediate devices in the route is 10, and the threshold is 7, it may be determined that the route matches a reference route if at least 7 the intermediate devices have characteristics that match devices in the reference route.

In some implementations, the matching of routes may be performed in the sequence in which the intermediate devices occur in the route. For example, if the route is caller device→device A→device B→device C→, and if the reference route is caller device→device P→device Q→device R→device S, the comparisons of characteristics may be performed in the same sequence. In some implementations, gaps (missing intermediate device) or additions (additional devices in the sequence) in the sequence may be ignored when comparing routes. If it is determined that the route does not match the reference route, it is determined that the location is spoofed.

In some implementations, a combination of any of timezone comparison, comparison of the number of hops with the reference number, and matching of the route with a reference route may be used to determine whether the location is spoofed. For example, in some implementations, the location may be determined as spoofed when the number of hops is different and the route associated with the call does not match the reference route. In another example, in some implementations, the location may be determined as spoofed when at least one condition is true: the timezones are different, the number of hops is different, or the route associated with the call does not match the reference route.

If it is determined in block 216 that the location is spoofed, block 216 may be followed by block 224. Else, block 216 may be followed by block 218.

In block 218, if the user permits, location database 106 is updated. For example, location database 106 may be updated to include the caller ID (or a portion thereof, e.g., a portion that corresponds to a geography of the caller) and the one or more characteristics determined from the call header, along with an indication that the call is not a spoofed call. If the user does not provide permission, block 218 is not performed. Block 218 may be followed by block 220.

In block 220, it is determined if the access network used by the caller device is spoofed. In some implementations, a cellular network identifier and a cell identifier is retrieved from the call header. For example, the call header for a call that is genuine (originates from a cellular device) includes the cellular network identifier (e.g., that identifies the carrier associated with the cellular device) and the cell identifier (e.g., that corresponds to a base station that the cellular device is coupled to). On the other hand, the call header for a spoofed call, while indicating that the caller device is a cellular device may not include such information, or may include erroneous identifiers that are not consistent with known cellular infrastructure.

For example, call headers of prior genuine calls may be analyzed to determine known cellular infrastructure and corresponding information may be stored, e.g., in location database 106. For example, a spoofed call may indicate a cell/carrier identifier that does not actually exist, or that is inconsistent with the location associated with the caller device. In another example, the cellular network identifier may be inconsistent with other information in the call header, e.g., route information that indicates one or more intermediate devices or hops in the path from the caller device to the device that implements method 200.

The retrieved cellular network identifier and/or the cell/carrier identifier are analyzed to determine if the identifier is missing or erroneous. If it is determined in block 220 that at least one of the cellular network identifier or the cell identifier is missing or erroneous, it is determined that the access network associated with the incoming phone call is spoofed. For example, a malicious caller that attempts to make a call that originates from a VoIP or OTT caller device tries to mask the call by including a cellular identifier (e.g., a dummy cellular identifier), such masking can be detected by comparison of the cellular identifier with prior genuine calls.

If it is determined at block 220 that the access network is spoofed, block 220 may be followed by block 226. Else, block 220 may be followed by block 222.

In block 222, a label is assigned to the incoming phone call. In some implementations, more than one labels may be assigned to the call. In some implementations, assigning a label to the call may include assigning a label that indicates whether the incoming phone call is a spoofed call. For example, if it is determined in block 216 that the location associated with the call is spoofed, or if it is determined in block 220 that the access network associated with the call is spoofed, a label is associated with the call that indicates that the call is a spoofed call.

In some implementations, assigning the label may include applying a training machine learning model to determine whether the incoming phone call is a robocall. The machine learning model may analyze call information such as caller ID; call header information such as caller device network address (IP address), route information, etc. to determine whether the call is a robocall. In some implementations, the machine learning model may be included as part of call labeling application 156. In some implementations, applying a trained machine learning model may include analyzing data using the model and generating an inference based on the model using an inference engine. In some implementations, the inference engine may be provided as part of call labeling application 156.

In some implementations, the machine learning model may be trained using data from a training database, e.g., training database 108. In some implementations, the data used for training may include prior call data. The prior call data may include prior caller ID, prior caller IP address, and prior call route information. Each call in the prior call data may have an indication of whether the prior call was a robocall or not a robocall. Further, the prior call data may include call characteristics for each of the prior calls.

In some implementations, supervised learning may be used to train the machine learning model. In these implementations, an untrained machine learning model, e.g., a neural network or other model, may be provided the indications for each prior call along with the call characteristics. During training, the machine learning model may generate indications of whether a call is a robocall based on call characteristics. A value based on the generated indications and the true indications in the prior call data may be calculated and used as feedback input to train the machine learning model. Based on the feedback value, weights of one or more neural network nodes and/or connectivity between nodes (e.g., between different layers of a multilayer neural network) may be adjusted. The training process may be repeated one or more times with different training data from the prior call data, e.g., until can generate indications with a threshold level of accuracy. In this manner, the machine learning model may learn features of the prior call data that are indicative of robocalls.

The indications in the prior call data may be generated manually or automatically and may reflect various characteristics that are associated with robocalls. For example, a prior call that has prior call data indicative of a caller phone number or caller internet protocol (IP) address that is associated with at least one of greater than a threshold number of prior outgoing calls in a particular period or multiple consecutive prior outgoing calls may be a robocall. In another example, a prior call that has prior call data indicative of a caller phone number that had at least three prior outgoing calls that were simultaneous may be a robocall. In another example, a prior call that had call data indicative of location spoofing or access network spoofing may be a robocall. In yet another example, prior call data is associated with a spam report may be a robocall. For example, a user that receives a call may be provided with a user interface that enables the user to submit the spam report that indicates that the call is a robocall, e.g., during the call or after the call.

In some implementations, the prior call data may be automatically analyzed to determine whether it is indicative of a large number of prior outgoing calls from a caller phone number or caller IP address in a particular period or multiple consecutive periods. For example, a robocaller may place a very large number of calls, e.g., 100 calls in a short time period, e.g., 10 minutes. In another example, a robocaller that uses an automated dialer may be characterized by multiple consecutive outgoing calls, e.g., 3 calls per minute, etc. with little to no intervening inactive period. Such patterns may be detected, e.g., using clustering techniques and be used to automatically assign an indication that the call is a robocall. Similarly, when call information indicates location spoofing or access network spoofing (e.g., determined as explained above with reference to blocks 212-220), it may be indicative of a robocaller. Block 222 may be followed by block 228.

In block 228, the label is sent to the callee device, e.g., along with a notification of the incoming phone call. The label may be usable by the callee device, e.g., by call application 152, to provide a user alert that indicates that the incoming phone call is the spoofed call and/or the robocall. For example, the callee device may provide a visual or audio indication to a user of the callee device based on the label. In some implementations, if call application 152 includes functionality to automatically handle calls, the label may be usable by the callee device to perform actions such as automatically screening the call, declining the call, sending the call to voicemail, etc. Additional actions at the callee device can include labeling the call as spam. Further, if the user answers the call and determines it to be genuine, the user can report that the call was falsely labeled. With user permission, such user-provided feedback can be used for training. Block 228 may be followed by block 230.

In block 230, user feedback regarding the incoming phone call may be received. For example, the user feedback may indicate whether the label associated with the call was correct or incorrect, e.g., a robocall not identified by the label, a genuine call labeled as spoofed, etc. With user permission, training database 108 may be updated based on the user feedback. For example, call information about the call may be added to training database 108. If the user declines permission to store call information and/or indications, block 230 is not performed, or is performed to only store such data for which the user has provided permission. In some implementations, e.g., if a client device also implements detection of spoofed calls or robocalls, results from such detection on the client device can also be utilized as training data, with user permission.

If it is determined in block 216 that the location is spoofed, block 216 may be followed by block 224. In block 224, training database 108 may be updated, e.g., to store call information about the call and an indication that the location of the call was spoofed. If the user declines permission to store call information and/or indications, block 224 is not performed, or is performed to only store such data for which the user has provided permission. Block 224 may be followed by block 218.

If it is determined in block 220 that the access network is spoofed, block 220 may be followed by block 226. In block 226, training database 108 may be updated, e.g., to store call information about the call and an indication that the access network of the call was spoofed. If the user declines permission to store call information and/or indications, block 226 is not performed, or is performed to only store such data for which the user has provided permission. Block 226 may be followed by block 222.

In some implementations, the trained machine learning model may be updated, e.g., based on the use of additional training data, e.g., added to training database 108 in any of blocks 224, 226, or 230. Additional training may improve accuracy of label prediction and/or speed of applying the model.

In some implementations, trained model may be customized based on a device (e.g., server device 104) that the local classifier is executed on. For example, different client devices may have different processing capabilities based on available hardware, e.g., a single-core processor, a multi-core processor, one or more parallel processors, a graphics processor with a number of graphics processing units (GPUs), a reconfigurable processor (e.g., FPGA), a neural network processor, etc. Further, different devices may have different availability levels of other resources such as memory, network bandwidth, etc. For example, a trained model with relatively higher complexity may be provided in a device that has a neural network processor or a GPU that is optimized for parallel processing, e.g., that the inference engine utilizes. In this example, greater processing capabilities of a device are utilized to implement a trained model. In another example, a simplified trained model (e.g., with fewer neural network nodes or layers) may be provided in a device that has greater resource constraints, e.g., a single-core processor with limited capabilities.

Method 200 provides several technical benefits. By utilizing call information such as caller ID and call header, method 200 enables automatic detection of spoofed calls, e.g., that have location and/or access network that indicates that the call is not a genuine call. Further, method 200 also enables automatic detection of robocalls by matching one or more call characteristics with patterns associated with robocalls. Labels generated using method 200 enables a callee device to eliminate redundant call notifications (e.g., by automatically screening calls), or to provide an improved user interface (e.g., that provides user alerts of spoofed calls or robocalls).

Another technical benefit is that method 200 can assign labels to calls that originate on an IP network, calls that originate abroad (not the same country as the callee device), etc. using call headers. Further, method 200 implemented on a server device in a carrier network can detect spoofed calls and robocalls without a client device having to install or run any client-side application, or store data at a client device for the purposes of call labeling. Still further, method 200 can label calls even when user reports of spoofed calls, robocalls, or other unwanted calls from prior calls are unavailable. Still further, method 200 can be implemented by individual carriers that receive incoming phone calls (destination carriers), without synchronization or other requirements on other carriers.

While method 200 has been described with reference to various blocks in FIG. 2, it may be understood that the techniques described in this disclosure may be performed without performing some of the blocks of FIG. 2. For example, some implementations, one or more of blocks 224, 226, and 230 may not be performed.

In another example, in some implementations, one or more of detection of location spoofing (block 216), access network spoofing (block 220), and whether the call is a robocall (block 222) may not be performed. In some implementations, one or more of the blocks illustrated in FIG. 2 may be combined. For example, blocks 212 and 214 may be combined. In various implementations, some of the blocks of method 200 may be performed in parallel or in an order different from that illustrated in FIG. 2. For example, in some implementations, blocks 216 and 218 may be performed in parallel. In another example, block 218 may be performed prior to block 216. In some implementations, block 222 may be split into multiple blocks, e.g., a block in which it is detected whether the call is a robocall, and a separate block in which a label is assigned to the call.

In some implementations, method 200 may be implemented by a server device that part of a carrier network of a carrier associated with the callee. In these implementations, route information included in the call header includes information associated with hops between the caller device and the server device may include intermediate devices that are used for call routing. Therefore, the server device has access to route information that can be used to detect spoofing. In some implementations, method 200 may be implemented as part of IP multimedia subsystem (IMS) core network of carrier infrastructure.

In some implementations, method 200 may be performed prior to alerting a call recipient of the incoming phone call, e.g., prior to providing a signal to the caller device to ring the telephone. By performing method 200 in this manner, the label generated for the call may be provided together with the incoming call signal, enabling the caller device to provide user alerts or perform automatic actions based on the label.

FIG. 3 is a diagram illustrating an example call header 300 for a phone call. As illustrated in FIG. 3, call header 300 includes a network address, e.g., IP address 302, of a caller device that initiates the phone call. In some implementations, the network address may an IP v4 address, or an IP v6 address. Call header 300 further includes a length of path 304. In the example shown in FIG. 3, the call header utilizes session initiation protocol (SIP) and the length of path is indicated by a field "Max-Forwards" with the value 66.

Call header 300 further includes time zone information 306. In the example illustrated in FIG. 3, the timezone associated with the caller device is GMT-8 hours. Call header 300 further include route information 308. Route information 308 includes one or more records associated with intermediate devices or hops between a caller device and the device at which a call initiation message is received. Each hop may add (e.g., append) its own information to the call header prior to forwarding the call initiation message to the next hop. In the example shown in FIG. 3, route information 308 includes information regarding two intermediate devices (servers).

Call header 300 further includes cellular network information 310. In the example illustrated in FIG. 3, cellular network information 310 includes a type of cellular network (3GPP), a cell id for the cell that the caller device is coupled to, among other information. Call header 300 further includes a visited network ID 312. In the example illustrated in FIG. 3, visited network ID 312 indicates a carrier name.

It will be understood that call headers for various calls may include additional fields or may include fewer fields than the example illustrated in FIG. 3. Call header 300 may be in a format specified by a protocol such as session initiation protocol (SIP). Such a protocol may be used for carrier interconnects.

Figure 4A:
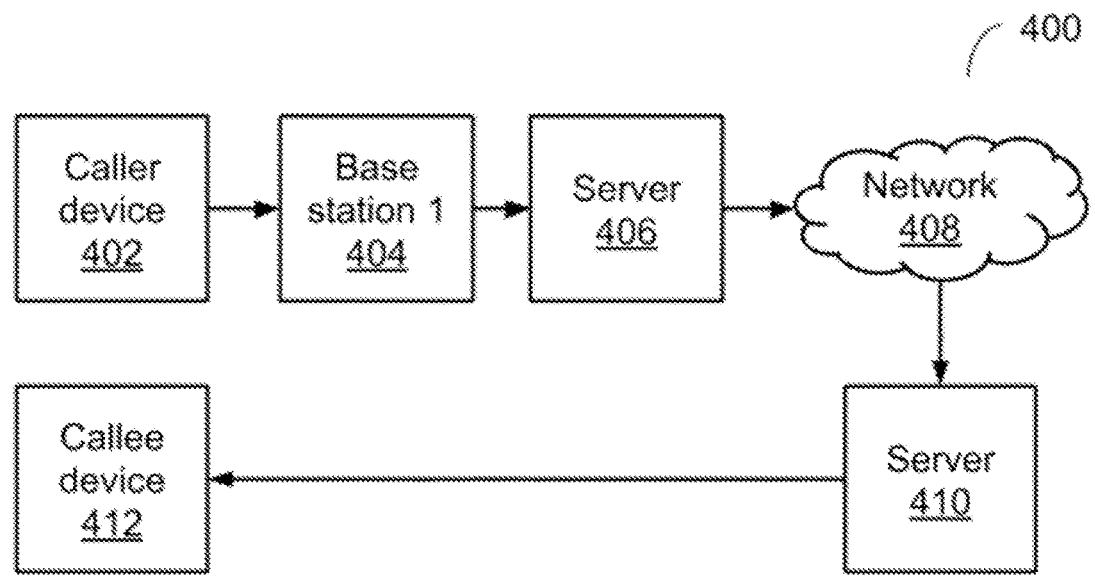
FIG. 4A is a diagram illustrating an example call route.

FIG. 4A is a diagram illustrating an example call flow 400, according to some implementations. As illustrated in FIG. 4A, a caller device 402 is used to place a call. In the example illustrated in FIG. 4A, caller device 402 is a cellular telephony device. Caller device 402 is coupled to a base station 404. When the call is initiated, caller device 402 sends a call request to a base station 404. Base station 404 relays the call request to a server 406, e.g., a server associated with the cellular network carrier for the caller device 402.

Server 406 sends the call request to another server 410 via a network 408. For example, network 408 may include the internet. In another example, network 408 may include a private network that couples server 406 and server 410. Server 410 may relay the call request to a callee device 412 (intermediate portions of the route not shown). Callee device may be any type of device, e.g., a cellular telephone, a landline telephone, a voice over IP (VoIP) client, or any other device that is associated with a telephone number.

While FIG. 4A illustrates the use of a mobile device to initiate a call, other types of devices, e.g., landline telephones, satellite telephones, voice over IP (VoIP) clients, or any other type of device may initiate a call. Different routes may be used for each of these types of caller devices.

In the process of routing the call, one or more devices in the route may update a call header of the call, e.g., to include information about itself. In some implementations, updating the call header may include appending information to the call header. Further, each device in the route may determine a network address associated with a subsequent device in the route and forward the call request to the subsequent device after updating the call header. In this manner, when the call request reaches server 410, it may include information regarding the route, including the devices that the call was routed over and the sequence in which those devices received the call request. The information may include information about connections among multiple carriers/service providers.

In this example, the call request originates from a cellular telephone and terminates at the call request reaches the callee device. The call header includes route information that is consistent with a call originating at a cellular telephone, e.g., information such as caller timezone, number of hops, etc. is consistent with the caller ID.

Figure 4B:
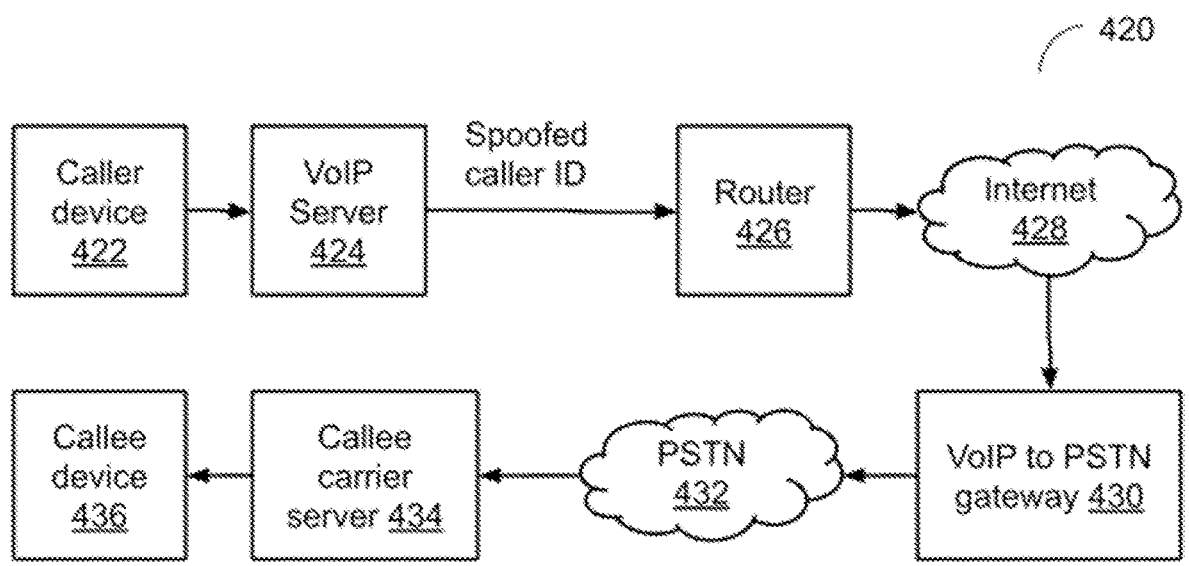
FIG. 4B is a diagram illustrating another example call route.

FIG. 4B is a diagram illustrating another example call flow 420, according to some implementations. As illustrated in FIG. 4B, a caller device 422 is used to place a call. In the example illustrated in FIG. 4B, caller device 422 is a VoIP device. Caller device 422 is coupled to a VoIP server 424. When the call is initiated, caller device 422 sends a call request to VoIP server 424. VoIP server 424 adds a spoofed caller ID, e.g., associated with a cellular network and forwards the call request to a router 426.

Router 426 sends the call request over the internet 428 to a VoIP to PSTN gateway 430. Gateway 430 interfaces to PSTN 432 via which the call request is relayed to callee carrier server 434. The callee carrier server send the call request to callee device 436.

In this example, the call request originates from a VoIP caller device that attempts to present itself as a cellular device and terminates at the call request reaches the callee device. Method 200 can be implemented at an intermediate device, e.g., callee carrier server 434, to detect whether the call is a spoofed call or a robocall, and the generated label may be provided to callee device 436.

Figure 5:
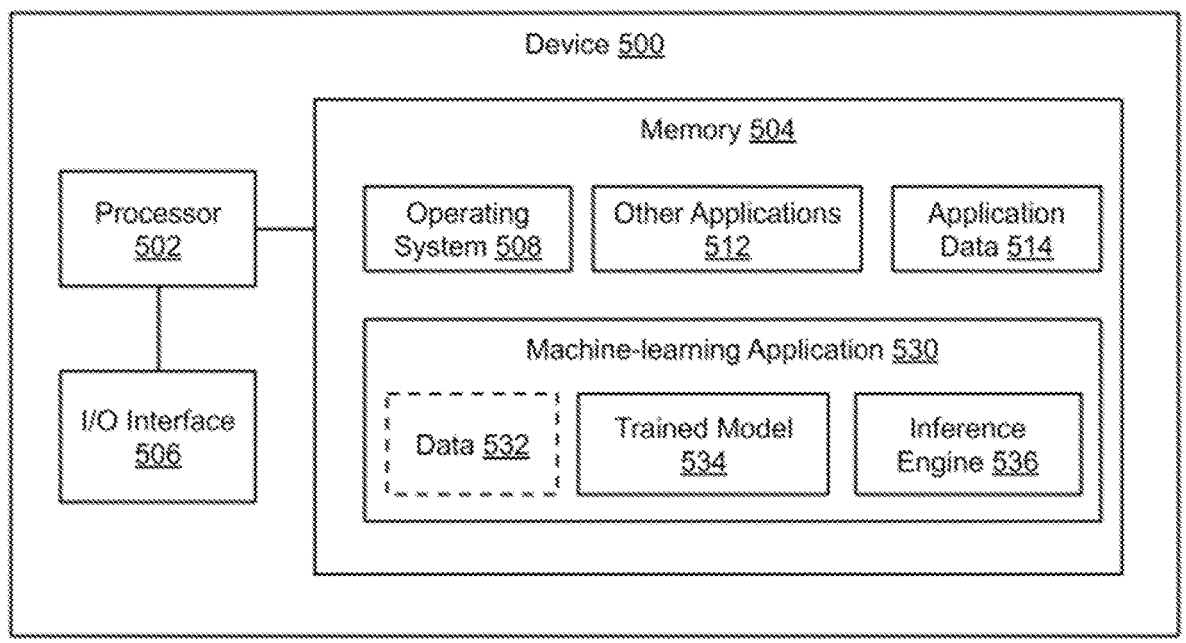
FIG. 5 is a block diagram of an example device which may be used for one or more implementations described herein.

FIG. 5 is a block diagram of an example device 500 which may be used to implement one or more features described herein. In one example, device 500 may be used to implement a client device, e.g., any of client devices 120-126 shown in FIG. 1. Alternatively, device 500 can implement a server device, e.g., server device 104. In some implementations, device 500 may be used to implement a client device, a server device, or both client and server devices. Device 500 can be any suitable computer system, server, or other electronic or hardware device as described above.

One or more methods described herein can be run in a standalone program that can be executed on any type of computing device. In an example, all computations can be performed within an application on a server device.

In some implementations, device 500 includes a processor 502, a memory 504, and input/output (I/O) interface 506. Processor 502 can be one or more processors and/or processing circuits to execute program code and control basic operations of the device 500. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 502 may include one or more co-processors that implement neural-network processing. In some implementations, processor 502 may be a processor that processes data to produce probabilistic output, e.g., the output produced by processor 502 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, machine-learning application 530, other applications 512, and application data 514. Other applications 512 may include applications such as a data display engine, web hosting engine, image display engine, notification engine, call handling engine, social networking engine, etc. In some implementations, the machine-learning application 530 and other applications 512 can each include instructions that enable processor 502 to perform functions described herein, e.g., the method of FIG. 2.

In various implementations, machine-learning application 530 may utilize Bayesian classifiers, support vector machines, neural networks, or other learning techniques. In some implementations, machine-learning application 530 may include a trained model 534, an inference engine 536, and data 532. In some implementations, data 532 may include training data, e.g., data used to generate trained model 534. For example, training data may include any type of data such as call information from prior calls. Training data may be obtained from any source, e.g., a data repository specifically marked for training, data for which permission is provided for use as training data for machine-learning, etc. In implementations where one or more users permit use of their respective user data to train a machine-learning model, e.g., trained model 534, training data may include such user data. In implementations where users permit use of their respective user data, data 532 may include permitted data such as call labels, call headers, caller ID, or other user-permitted information.

In some implementations, training data may include synthetic data generated for the purpose of training, such as data that is not based on user input or activity in the context that is being trained, e.g., data generated from simulated calls. In some implementations, machine-learning application 530 excludes data 532. For example, in these implementations, the trained model 534 may be generated, e.g., on a different device, and be provided as part of machine-learning application 530. In various implementations, the trained model 534 may be provided as a data file that includes a model structure or form, and associated weights. Inference engine 536 may read the data file for trained model 534 and implement a neural network with node connectivity, layers, and weights based on the model structure or form specified in trained model 534.

Machine-learning application 530 also includes a trained model 534. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 532 or application data 514. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a label (or set of labels) for a call, a feature vector for the call, etc. depending on the specific trained model. In some implementations, model form or structure also specifies a number and/or type of nodes in each layer.

In different implementations, trained model 534 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 534 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 532, to produce a result.

For example, training may include applying supervised learning techniques. In supervised learning, the training data can include a plurality of inputs (e.g., call data for prior calls) and a corresponding expected output for each input (e.g., one or more labels for each call). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate calls such that the model distinguishes genuine calls from spoofed calls and/or robocalls.

In some implementations, unsupervised learning may be used to produce knowledge representations, e.g., that may be used by machine-learning application 530. In various implementations, a trained model includes a set of weights, or embeddings, corresponding to the model structure. In implementations where data 532 is omitted, machine-learning application 530 may include trained model 534 that is based on prior training, e.g., by a developer of the machine-learning application 530, by a third-party, etc. In some implementations, trained model 534 may include a set of weights that are fixed, e.g., downloaded from a server that provides the weights.

Machine-learning application 530 also includes an inference engine 536. Inference engine 536 is configured to apply the trained model 534 to data, such as application data 514, to provide an inference. In some implementations, inference engine 536 may include software code to be executed by processor 502. In some implementations, inference engine 536 may specify circuit configuration (e.g., for a programmable processor, for a field programmable gate array (FPGA), etc.) enabling processor 502 to apply the trained model. In some implementations, inference engine 536 may include software instructions, hardware instructions, or a combination. In some implementations, inference engine 536 may offer an application programming interface (API) that can be used by operating system 508 and/or other applications 512 to invoke inference engine 536, e.g., to apply trained model 534 to application data 514 to generate an inference.

Machine-learning application 530 may provide several technical advantages. For example, when trained model 534 is generated based on unsupervised learning, trained model 534 can be applied by inference engine 536 to produce knowledge representations (e.g., numeric representations) from input data, e.g., application data 514. For example, a model trained for call labeling may produce representations of calls that have a smaller data size (e.g., 1 KB) than input call data (e.g., 10 MB). In some implementations, such representations may be helpful to reduce processing cost (e.g., computational cost, memory usage, etc.) to generate an output (e.g., a label). In some implementations, such representations may be provided as input to a different machine-learning application that produces output from the output of inference engine 536. In some implementations, knowledge representations generated by machine-learning application 530 may be provided to a different device that conducts further processing, e.g., over a network. In such implementations, providing the knowledge representations rather than the call data may provide a technical benefit, e.g., enable faster data transmission with reduced cost.

In some implementations, machine-learning application 530 may be implemented in an offline manner. In these implementations, trained model 534 may be generated in a first stage, and provided as part of machine-learning application 530. In some implementations, machine-learning application 530 may be implemented in an online manner. For example, in such implementations, an application that invokes machine-learning application 530 (e.g., operating system 508, one or more of other applications 512) may utilize an inference produced by machine-learning application 530, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 534, e.g., to update embeddings for trained model 534.

In some implementations, machine-learning application 530 may be implemented in a manner that can adapt to particular configuration of device 500 on which the machine-learning application 530 is executed. For example, machine-learning application 530 may determine a computational graph that utilizes available computational resources, e.g., processor 502. For example, if machine-learning application 530 is implemented as a distributed application on multiple devices, machine-learning application 530 may determine computations to be carried out on individual devices in a manner that optimizes computation. In another example, machine-learning application 530 may determine that processor 502 includes a GPU with a particular number of GPU cores (e.g., 1000) and implement the inference engine accordingly (e.g., as 1000 individual processes or threads).

In some implementations, machine-learning application 530 may implement an ensemble of trained models. For example, trained model 534 may include a plurality of trained models that are each applicable to same input data. In these implementations, machine-learning application 530 may choose a particular trained model, e.g., based on available computational resources, success rate with prior inferences, etc. In some implementations, machine-learning application 530 may execute inference engine 536 such that a plurality of trained models is applied. In these implementations, machine-learning application 530 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 508 or one or more applications 512.

In different implementations, machine-learning application 530 can produce different types of outputs. For example, machine-learning application 530 can provide representations or clusters (e.g., numeric representations of call characteristics), labels (e.g., for call data), etc. In some implementations, machine-learning application 530 may produce an output based on a format specified by an invoking application, e.g. operating system 508 or one or more applications 512.

Any of software in memory 504 can alternatively be stored on any other suitable storage location or computer-readable medium. In addition, memory 504 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 504 and any other type of storage (magnetic disk, optical disk, magnetic tape, or other tangible media) can be considered "storage" or "storage devices."

I/O interface 506 can provide functions to enable interfacing the server device 500 with other systems and devices. Interfaced devices can be included as part of the device 500 or can be separate and communicate with the device 500.

For example, network communication devices, storage devices (e.g., memory and/or databases 106 and 108), and input/output devices can communicate via I/O interface 506. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

The I/O interface 506 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 5 shows one block for each of processor 502, memory 504, I/O interface 506, and software blocks 508, 512, and 530. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While some components are described as performing blocks and operations as described in some implementations herein, any suitable component or combination of components of environment 100, device 500, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to label an incoming phone call, the method comprising:
    detecting, at a server, the incoming phone call associated with a caller identifier (ID);
    determining, by the server, a location associated with the incoming phone call;
    analyzing, by the server, a call header of the incoming phone call to determine one or more call characteristics;
    determining, by the server, based on the location and the one or more call characteristics, if the location is spoofed;
    determining, by the server, based on the caller ID and the one or more call characteristics, if an access network associated with the incoming phone call is spoofed;
    applying, by the server, a trained machine learning model to determine whether the incoming phone call is a robocall;
    assigning, by the server, a label to the incoming phone call, wherein the label indicates whether the incoming phone call is a spoofed call or whether the incoming phone call is the robocall; and
    sending the label to a callee device associated with the incoming phone call.

2. The computer-implemented method of claim 1, wherein analyzing the call header of the incoming phone call comprises determining a route between a caller device associated with the incoming phone call and the server based on route information included in the call header.

3. The computer-implemented method of claim 2, wherein the one or more call characteristics comprise a number of hops between the caller device and the server, and wherein determining the route comprises calculating the number of hops based on the route.

4. The computer-implemented method of claim 3, wherein determining if the location is spoofed comprises:
    retrieving a reference number of hops from a database based at least in part on the route information included in the call header; and
    determining that the location is spoofed if the number of hops is different from the reference number of hops.

5. The computer-implemented method of claim 2, wherein determining if the location is spoofed comprises:
    retrieving a reference route from a database based at least in part on the caller ID;
    determining whether the route matches the reference route; and
    in response to determining that the route does not match the reference route, determining that the location is spoofed.

6. The computer-implemented method of claim 5, further comprising determining respective one or more characteristics of a plurality of intermediate devices in the route based on the call header, and wherein determining whether the route matches the reference route comprises:
    determining a count of the plurality of intermediate devices that have respective one or more characteristics that match characteristics of intermediate devices in the reference route; and
    determining that the route matches the reference route if the count of the plurality of the plurality of intermediate devices meets a threshold.

7. The computer-implemented method of claim 1, wherein analyzing the call header of the incoming phone call comprises determining a timezone associated with the incoming phone call, and wherein determining if the location is spoofed comprises:
    determining a caller timezone based on the caller ID; and
    determining that the location is spoofed if the timezone associated with the incoming phone call is different from the caller timezone.

8. The computer-implemented method of claim 1, wherein analyzing the call header comprises determining, based on the call header, that the incoming phone call is associated with a cellular network, and wherein determining if the access network associated with the incoming phone call is spoofed comprises:
    retrieving a cellular network identifier and a cell identifier from the call header; and
    determining that the access network is spoofed if at least one of the cellular network identifier or the cell identifier is missing or erroneous.

9. The computer-implemented method of claim 1, wherein the machine learning model is trained using data from a training database, wherein the data comprises prior call data including prior caller ID, prior caller IP address, and prior call route information, wherein the prior call data for one or more prior calls in the prior call data is one or more of:
    indicative of a caller phone number or caller internet protocol (IP) address associated with at least one of:

greater than a threshold number of prior outgoing calls in a particular period or multiple consecutive prior outgoing calls;

indicative of a caller phone number that had at least three prior outgoing calls that were simultaneous;

indicative of location spoofing or access network spoofing; or associated with a spam report.

10. The computer-implemented method of claim 1, wherein the label is usable by the callee device to provide a user alert that indicates that the incoming phone call is the spoofed call and/or the robocall, or to automatically handle the incoming phone call.

11. A non-transitory computer-readable medium with instructions stored thereon that, when executed by one or more hardware processors, cause the one or more hardware processors to perform operations comprising:

detecting an incoming phone call associated with a caller identifier (ID);

determining a location associated with the incoming phone call;

analyzing a call header of the incoming phone call to determine one or more call characteristics;

determining, based on the location and the one or more call characteristics, if the location is spoofed;

determining, based on the caller ID and the one or more call characteristics, if an access network associated with the incoming phone call is spoofed;

applying a trained machine learning model to determine whether the incoming phone call is a robocall;

assigning a label to the incoming phone call, wherein the label indicates whether the incoming phone call is a spoofed call or whether the incoming phone call is the robocall; and sending the label to a callee device associated with the incoming phone call.

12. The non-transitory computer-readable medium of claim 11, wherein analyzing the call header of the incoming phone call comprises determining a route between a caller device associated with the incoming phone call and the server based on route information included in the call header.

13. The non-transitory computer-readable medium of claim 12, wherein the one or more characteristics comprise a number of hops between the caller device and the server, and wherein determining the route comprises calculating the number of hops based on the route.

14. The non-transitory computer-readable medium of claim 13, wherein determining if the location is spoofed comprises:

retrieving a reference number of hops from a database based at least in part on the route information included in the call header; and determining that the location is spoofed if the number of hops is different from the reference number of hops.

15. The non-transitory computer-readable medium of claim 12, wherein determining if the location is spoofed comprises:

retrieving a reference route from a database based at least in part on the caller ID;

determining whether the route matches the reference route; and in response to determining that the route does not match the reference route, determining that the location is spoofed.

16. The non-transitory computer-readable medium of claim 11, wherein analyzing the call header comprises determining, based on the call header, that the incoming phone call is associated with a cellular network, and wherein determining if the access network associated with the incoming phone call is spoofed comprises:

retrieving a cellular network identifier and a cell identifier from the call header; and determining that the access network is spoofed if at least one of the cellular network identifier or the cell identifier is missing or erroneous.

17. The non-transitory computer-readable medium of claim 11, wherein the label is usable by the callee device to provide a user alert that indicates that the incoming phone call is the spoofed call and/or the robocall, or to automatically handle the incoming phone call.

18. A system comprising:

one or more hardware processors; and a memory coupled to the one or more hardware processors, with instructions stored thereon, that when executed by the one or more hardware processors, cause the one or more hardware processors to perform operations comprising:

detecting an incoming phone call associated with a caller identifier (ID);

determining a location associated with the incoming phone call;

analyzing a call header of the incoming phone call to determine one or more call characteristics;

determining, based on the location and the one or more call characteristics, if the location is spoofed;

determining, based on the caller ID and the one or more call characteristics, if an access network associated with the incoming phone call is spoofed;

applying a trained machine learning model to determine whether the incoming phone call is a robocall; and assigning a label to the incoming phone call, wherein the label indicates whether the incoming phone call is a spoofed call or whether the incoming phone call is the robocall.

19. The system of claim 18, wherein analyzing the call header of the incoming phone call comprises determining a route between a caller device associated with the incoming phone call and the server based on route information included in the call header.

20. The system of claim 19, wherein the one or more characteristics comprises a number of hops between the caller device and the server, wherein determining the route comprises calculating the number of hops based on the route, and wherein determining if the location is spoofed comprises:

retrieving a reference number of hops from a database based at least in part on the route information included in the call header; and determining that the location is spoofed if the number of hops is different from the reference number of hops.

* * * * *